United States Patent [19]

Hester

[11] Patent Number: 4,653,902
[45] Date of Patent: Mar. 31, 1987

[54] COLOR CORRECTION HEAD

[75] Inventor: Ronald E. Hester, Ringwood, United Kingdom

[73] Assignee: Maxiprint Systems Limited, Wimborne, United Kingdom

[21] Appl. No.: 831,926

[22] Filed: Feb. 20, 1986

[51] Int. Cl.⁴ .................... G03B 27/32; G03B 27/52
[52] U.S. Cl. ................................. 355/32; 355/35
[58] Field of Search ..................... 355/32, 35, 74

[56] References Cited

U.S. PATENT DOCUMENTS

| | | | |
|---|---|---|---|
| 2,217,405 | 10/1940 | Hanna et al. | 352/194 |
| 2,518,947 | 8/1950 | Simmon | 355/35 |
| 2,921,499 | 1/1960 | Weisglass et al. | 355/35 |
| 3,800,070 | 3/1974 | Barbieri | 355/74 |
| 3,883,243 | 5/1975 | Weisglass et al. | 355/35 |
| 4,319,834 | 3/1982 | Terrill | 355/35 |
| 4,375,918 | 3/1983 | Isono et al. | 355/35 |

FOREIGN PATENT DOCUMENTS 467469 2/1969 Switzerland .................... 355/32

Primary Examiner—Monroe H. Hayes
Attorney, Agent, or Firm—Lee A. Strimbeck

[57] ABSTRACT

In a photographic color correction head filters are movable across a light path by DC motors. The motors drive cams via high reduction gearboxes and the filters are carried on supports urged against the cams by springs. The filters remain in their selected position when the motors are switched off due to internal friction in the gearboxes.

19 Claims, 7 Drawing Figures

COLOR CORRECTION HEAD

BACKGROUND OF THE INVENTION

The present invention relates to a color correction head in particular, though not exclusively, for a color photographic printer and enlarger.

Due to variation in quality in color print paper and variations in overall density of color in color negatives, the color of light to be projected through color negatives during printing therefrom needs to be adjustable in a color correction head.

Color correction heads exist in which the color of the light after projection through a negative is analysed and filters are driven in and out of the path of the light, upstream of the negative, in accordance with the analysis to suit the balance of colors in the projected light to the photographic paper, whereby an accurate color print is obtained. Such conventional color correction heads have been complex and expensive, principally due to the use of stepper motors for driving the filters into position.

Many of the conventional color correction heads have employed rack and pinion drives between the stepper motor and the filter. Such drives are susceptible of backlash and stiction problems, whereby different actual color balances are in fact achieved despite identical positionings of the stepper motors on account of the direction in which the stepper motor has rotated to the desired position.

The object of the present invention is to provide an improved color correction head.

THE INVENTION

According to the invention there is provided a color correction head comprising a body of the head; at least two or more drivable filters positionable to a desired extent across a light path in the head; a respective pair or more of filter supports drivably mounted in the head, each carrying its filter; a respective pair or reversible DC more of motors mounted in the head, each being for moving its filter; a respective pair or more of high reduction gearboxes, each being coupled to its motor for providing an output-drive rotational speed from the gearbox highly reduced from that of its motor; and a respective pair or more of drive connections, each for connecting between the output of its gearbox and its filter support to enable its motor to drive via its gearbox its filter to a desired position, said gearboxes providing sufficient internal friction to maintain said filters in their said desired position.

Where only two drivable filters are provided, they may be a selected pair from the three conventional color filters: cyan, magenta and yellow. The two drivable filters only may be provided. Alternatively, it will normally be convenient to provide a third filter, with a manual arrangement for selecting its position in the light path. Also it is possible for the third filter to be provided with a motor drive similar to those of the drivable filters. This is convenient for use of the color correction head for both positive and negative color correction.

Preferably each drive connection is a reciprocating connection, that is to say a connection in which the filter is moved back after being advanced to a dead-centre point on further rotation of the output shaft of the gearbox; although conceivably a drive connection such as a rack and pinion could be used. In the preferred embodiment the reciprocating drive connection is a cam drive. The cam may be double acting providing positive drive in both directions. However it is preferred that the cam is single acting with a spring being provided for continuously urging a contact member on the filter support against the cam. The spring may act between the filter support and the body; however to maintain even loading on the motor, the spring preferably acts between the filter support and the cam. The cam may have a variety of shapes, but the preferred shape is an eccentric circle whereby it may be driven in either direction to a desired orientation. As an alternative to a cam drive, each reciprocating drive connection may be in the form of a crank carried by the output shaft of its gearbox and a connecting rod connecting the crank to the filter support. Again a spring may be provided to remove the effect of any backlash present in the connection.

The filter supports may be slidingly mounted on the body, but are preferably pivotally mounted thereon. Conveniently pivot axes of the filter supports are arranged substantially parallel to and substantially equally radially spaced from the light path and the motors are arranged outwardly of the pivots around a lamp at the origin of the light path.

The color correction head may be provided in the form of a filter pack assemblable into a color correction unit also comprising a lamp and a diffusion box.

It is envisaged that the color correction head will be used with an automatic analysiser which will measure the light projected from the color negative and in accordance with the measurement operate the motors via a servo unit to drive the drivable filters in or out of the light path until the color balance of the measured light corresponds to that required to suit the color photographic paper to be used.

For simplicity of drive circuitry and cheapness, the motors are preferably reversible DC motors. The analysiser via the servo unit powers them to the desired position of the filters with an ON drive voltage and then stops them at their positions by the application of a small reverse OFF voltage or preferably by short circuiting their terminals together. Provided inertia of the motors is low, virtually no overshoot of the motors is experienced. Further, despite the presence of the filter biasing springs where provided, the internal friction of the gearboxes and the motors is sufficient to lock the position of filters on account of the high reduction ratio of the gearboxes. A practical minimum ratio has been found to be approximately 150:1. Substantially lower ratios could cause problems of over-run and slipping due to inadequate internal friction for braking against the springs. Very much higher reduction ratios are effective, typically 6000:1.

To help understanding of the invention, two specific embodiments thereof will now be described by way of example and with reference to the accompanying drawings in which:

THE DRAWINGS

FIRST EMBODIMENT

Figure 1:
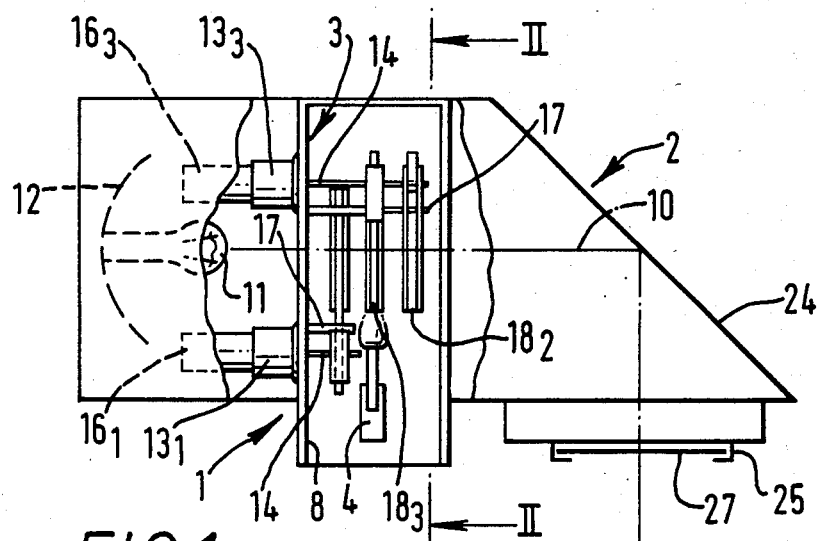
FIG. 1 is a side view of a color correction head of the invention shown in a broken away color correction unit.
Figure 2:
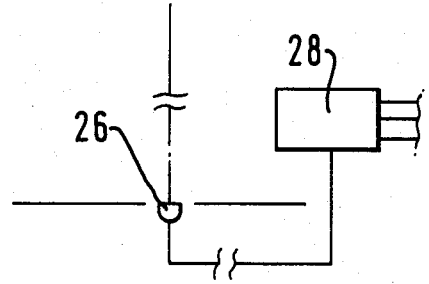
FIG. 2 is a cross-sectional front view on the line II—II in FIG. 1.
Figure 2:
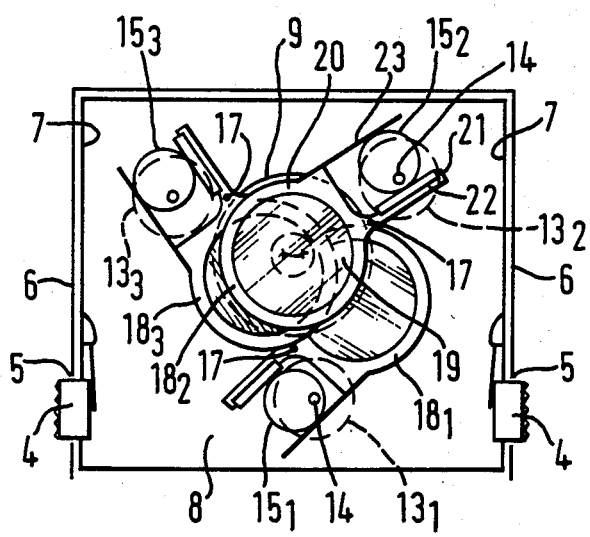

Referring first to FIGS. 1 and 2, the color correction head 1 there shown is mounted as a disassemblable filter pack in a color correction unit 2. The head 1 has a body 3 accommodated in the unit 2 and held there by catches 4 sprung out to engage in apertures 5 in side panels 6 of the unit 2. The body is of pressed sheet metal having stiffening side flanges 7 and a chassis plate 8 having a central aperture 9 for a light path 10. The light path originates at a lamp 11 and associated mirror 12 mounted at the rear of the unit 2.

The chassis plate 8 has mounted on its rear face at 120° radial spacings around the light path 10 high reduction gearboxes $13_1$, $13_2$, $13_3$ typically of 150 to 1 reduction. The output shafts 14 of the gearboxes extend parallel with the light path 10 and carry eccentric circular cams $15_1$, $15_2$, $15_3$. To the rear of the gearboxes are mounted reversible DC motors $16_1$, $16_2$, and $16_3$. Suitable motors and gearboxes can be obtained as coupled units from Minimotor SA, of Agno, Switzerland. The arrangement is such that one motor $16_1$ is positioned below the lamp 11 and mirror 12 whilst the other two $16_2$ and $16_3$ are positioned above and one on either side of the the lamp 11. The arrangement allows the head 1 including the motors to be dropped from the unit 2 as required, for instance for cleaning of the filters to be described.

The chassis plate 8 carries three pivot pins 17 on which are pivotally mounted respective filter supports $18_1$, $18_2$, $18_3$. Since only support $18_2$ is clearly shown in FIG. 2, the others being behind, it only will be described in detail. The others are partially obscured. They are substantially identical and carry cyan and magenta filters. The filter support $18_2$ carries a yellow filter 19 at a yoke 20 at one end. At its other, opposite end the filter support has an arm 21 carrying a nylon bearing pad 22. The support $18_1$ is centrally pivotally supported on one of the pins 17. The cam $15_2$ bears on the pad 22 and is maintained in contact therewith by a leaf spring 23 secured to the support $18_2$ in such manner to bear on the side of the cam opposite from the pad 22 with a constant force due to flexure of the spring.

In the position shown in FIG. 2, the filter 19 is positioned centrally of the light path 10, with the cam $15_2$ at its bottom dead-centre position with respect to the angular rotary position of it and of its shaft 14. On rotation of the motor $16_2$, the cam $15_2$ is turned from its bottom dead-centre position and the filter 19 swung progressively out of the light path. Cam $15_1$ is shown close to its top dead-centre position; whilst cam $15_3$ is at an intermediate position.

Figure 3:
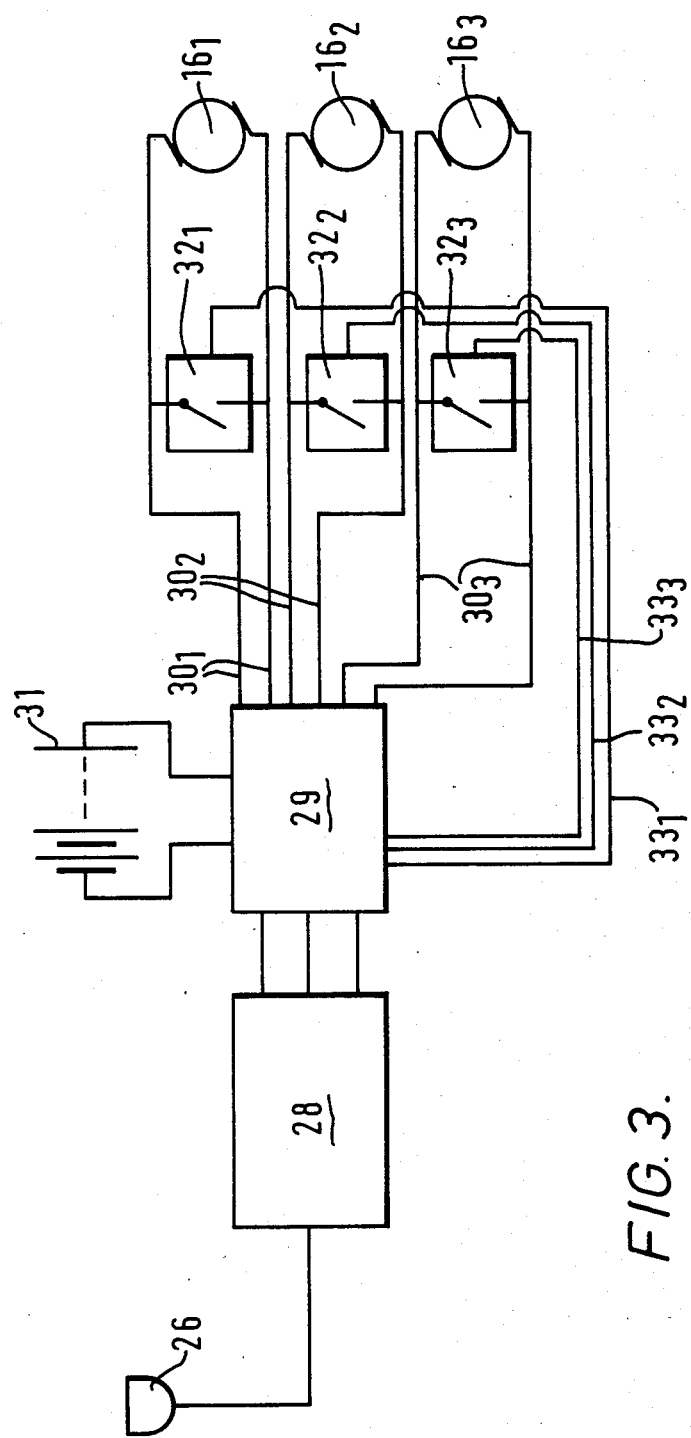
FIG. 3 is a block diagram of an analyser circuit for the color correction head of FIG. 1.

Opposite the head 1 from the lamp 11, the unit 2 has a diffusion box 24 for turning the light path downwards and through a negative support 25 towards an analyser probe 26. With a negative 27 at the support 25, the analyser 28 receives information concerning the color of light passing the negative. A suitable analyser can be obtained from Lici Fotometrische Industrie of Amsterdam, Netherlands. If the color of the light received by the analyser probe 26 is unsuitable, for the photographic paper to be used, a servo unit 29 controlled by the analyser passes voltage on lines $30_1$, $30_2$, $30_3$ in required polarity from a DC power source 31 (see FIG. 3) to relevant ones of the motors $16_1$, $16_2$, $16_3$ to drive the filters in the required direction in or out of the light path until a suitable color balance is achieved. When this is achieved, the servo unit 26 controls motor terminal-shorting switches $32_1$, $32_2$, $32_3$ via lines $33_1$, $33_2$, $33_3$, to cause the switches to close. The motors $16_1$, $16_2$, $16_3$, are permanent magnet motors and shorting of their terminals causes them to stop virtually instantaneously, whereby the filters are held in their positions due to internal friction in the gearboxes. It should be noted that the springs 23 act to keep the cams in contact with their pads 22 when the cams are driven away from the pads. Further the springs provide no resistance to turning of the cams, save for a small degree of friction.

SECOND EMBODIMENT

Figure 4:
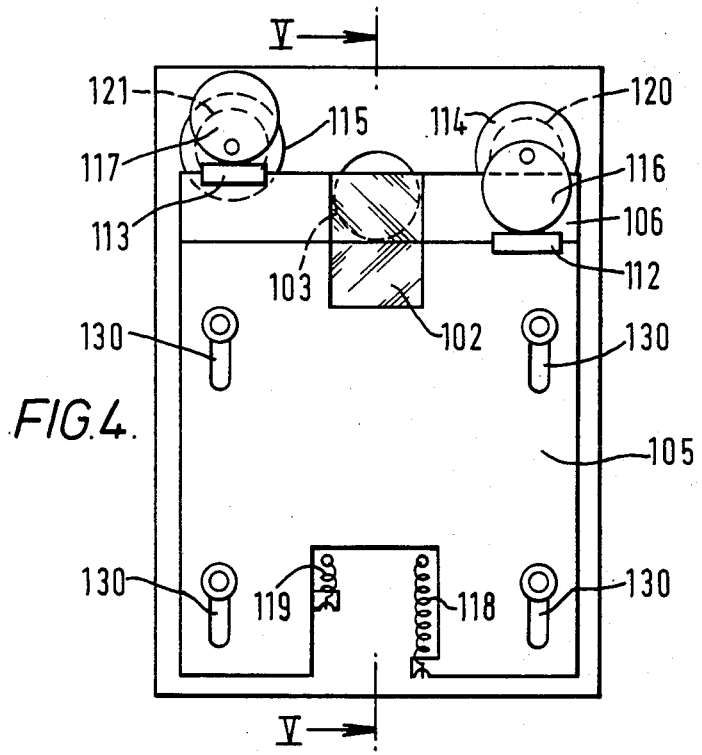
FIG. 4 is a front view on the line III—III in FIG. 5 of another color correction head of the invention.
Figure 5:
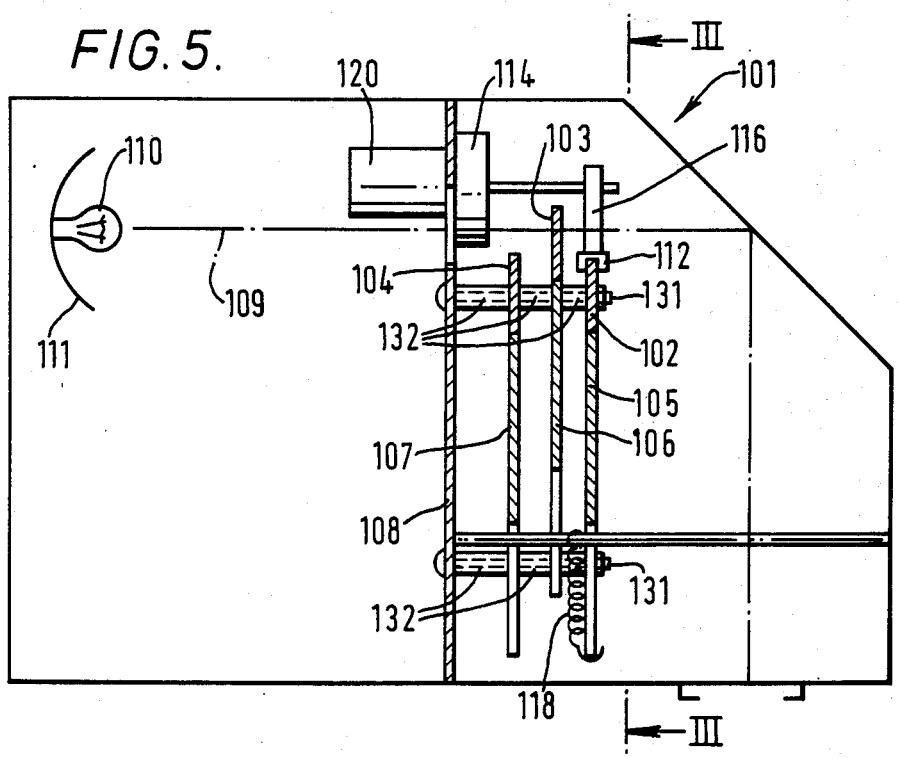
FIG. 5 is a cross-sectional view on the line V—V of the color correction head of FIG. 4.

Turning now to FIGS. 4 and 5, the color correction head 101 there shown has a pair of motor drivable filters 102,103 for instance colored yellow and magenta respectively and a manually adjustable filter 104 for instance colored cyan mounted on respective filter supports 105,106,107. These supports are mounted for movement upwards and downwards with respect to a body 108 of the color correction head so that the filters are movable into or out of a light path 109 from a lamp 110 and mirror 111. Each filter support is a generally rectangular plate and has four upright slots 130 close to each corner of the plate. Four pins 131 equipped with suitable spacers 132 and end clips engage in the slots for guiding the support plates, the pins being attached to the body 108. Since the pins and slots are well spaced, the plates have little tendency to jam when moved up and down as described below.

The filter supports 105,106 for the motor drivable filters 102,103 each have a nylon cam contact pad 112,113 mounted at their upper edges, but on opposite sides of the light path 109. Mounted on the body 108 adjacent the pads 112,113 are high reduction gearboxes 114,115 on the output shafts of which are secured circular eccentric cams 116,117 bearing respectively on the nylon pads 112,113. Springs 118,119 anchored in the body 108 urge their respective filter supports 105,106 upwards for maintaining the nylon pads in contact with their cams. DC motors 120,121 are connected to the input shafts of the high reduction gearboxes 114,115 respectively.

In use, a color photographic negative is placed in the light path downstream of the filters and an analysiser probe detects the light from the negative. According to the balance of this light, the analysiser and servo unit, not shown, drives the motors 120,121 to position the filters 102,103 for a color balance to suit the photographic paper to be used. Once the filters are in position the motors are switched off and the filters remain stationary as described above. It should be noted that as the filters are moved, the tension of the springs places a varying load on the motors.

Where the required adjustment is beyond the stroke of the cams the manual adjustment arrangements (not shown) for the third filter may be utilised.

The invention is not intended to be restricted to the above described embodiments. For instance the nylon pads and cams may be positioned other than at the top edges of the filter supports. The filters may be arranged to enter the light path from opposite directions.

Figure 6:
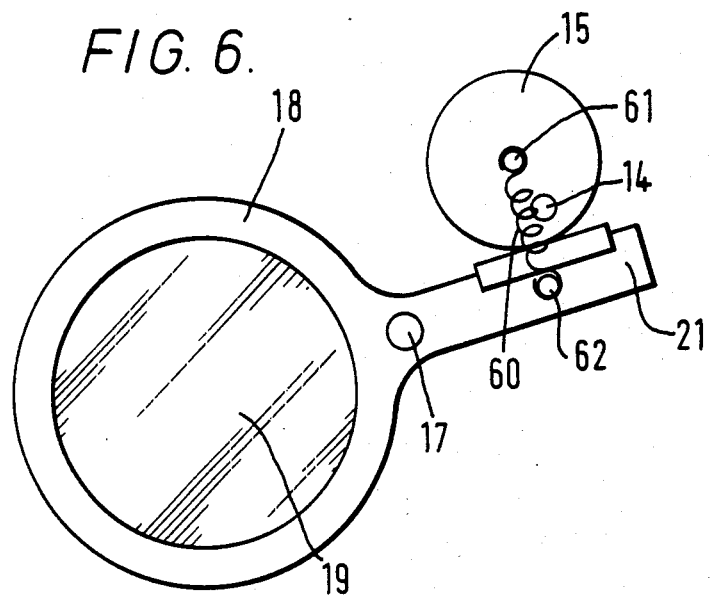
FIG. 6 shows in a partial view similar to FIG. 2, but on a larger scale, an alternative spring for biassing the cam and the filter support together for the color correction head of FIG. 1.
Figure 7:
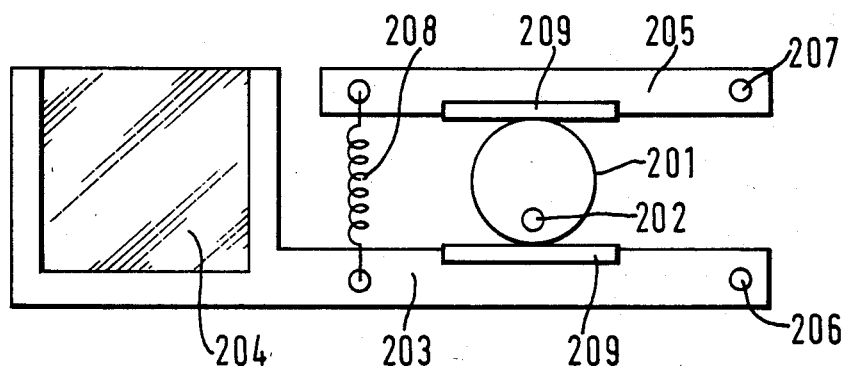
FIG. 7 shows in another partial view similar to FIG. 2, but on a larger scale, an alternative filter support and cam connection for the color correction head of FIG. 1.

In the first embodiment, the leaf springs may be replaced by levers pivoted to the filter supports and torsion or tension springs urging the levers towards their supports. Alternatively, where as is preferred the cams are of eccentric circular shape, tension springs may act between the centers of the cams and their filter supports. Such an arrangement is shown in FIG. 6, with a tension spring 60 acting between a pin 61 at the center of a cam 15 on a shaft 14 and a pin 62 on the arm 21 of a support 18 for a filter 19 pivotally mounted about a pin 17. Another alternative is shown in FIG. 7, an eccentric cam 201 on a gearbox output shaft 202 is positioned between a support 203 for a filter 204 and an arm 205. The support 203 is pivoted to the head body at the end opposite from the filter via a pin 206. The arm 205 is similarly pivoted via a pin 207. The free end of the arm 205 and the filter support 203, between the position of the cam 201 and the filter 204, are urged together by a tension spring 208 acting between them. Both the arm 205 and the support 203 have bearing pads 209 for the cam 201 to bear against. As the cam 201 is rotated the combination of the support 203, with the filter 204, and the arm 205 move with it.

Other uses are envisaged for the color correction head, in particular for controlling the color of display or theatrical lights.

I claim:

1. A color correction head comprising:
   a body of said head;
   a light path defined in said head;
   at least two or more drivable color filters movably supported in said head for positioning to a desired extent across said light path;
   a respective pair or more of filter supports drivably mounted in said body each carrying its said filter;
   a respective pair or more of reversible DC motors mounted in said head, each being for moving its said filter;
   a respective pair or more of high reduction gearboxes each being coupled to its said motor for providing an output-drive on an output shaft from said gearbox highly reduced from that of its said motor; and
   a respective pair or more of drive connections, each for connecting between said output shaft of its said gearbox and its said filter support to enable its said motor to drive via its said gearbox its said filter to a desired position, said gearboxes providing sufficient internal friction to maintain said filters in their said desired position.

2. A color correction head according to claim 1, wherein each said drive connection is a reciprocating connection.

3. A color correction head according to claim 2, wherein each said reciprocating connection is a cam connection.

4. A color correction head according to claim 3, wherein each said cam connection comprises:
   a cam carried by said output shaft of its said gearbox;
   a single cam surface on its said filter support, whereby said cam is arranged as a single acting cam; and
   a spring acting to maintain said cam in contact with its said filter support.

5. A color correction head according to claim 4, wherein each said spring acts between its said filter support and said body.

6. A color correction head according to claim 4, wherein each said spring is a leaf spring arranged to act between its said filter support and its said cam, slidingly contacting the side of said cam opposite from said cam surface acting on its said filter support.

7. A color correction head according to claim 4, wherein each said cam is circular and each said spring is a tension spring arranged to act between the center of said cam and its said filter support.

8. A color correction head according to claim 3, wherein each said cam connection comprises a cam carried by said output shaft of its said gearbox and a pair of cam surfaces on its said filter support whereby said cam is arranged as a double acting cam.

9. A color correction head according to claim 2, wherein each said drive connection comprises a crank carried by said output shaft of its said gearbox and a connecting rod connecting said crank to its said filter support.

10. A color correction head according to claim 1, wherein said filter supports are slidingly mounted on said body.

11. A color correction head according to claim 1, wherein said filter supports are pivotally mounted on said body.

12. A color correction head according to claim 10, wherein a lamp is provided in said head at the origin of said light path and pivot axes of said filter supports are arranged substantially parallel to and substantially equally radially spaced from said light path and said motors are arranged outwardly of said pivots around said lamp at the origin of said light path.

13. A color correction head according to claim 1, wherein two drivable filters are provided and a third manually adjustable filter is provided.

14. A color correction head according to claim 1, in combination with a color analyser having a servo unit incorporating means for shorting together terminals of said motors when said filter supports have been driven to their desired position, and wherein said reversible DC motors are permanent magnet motors.

15. A color correction head according to claim 1, wherein said head is provided as a filter pack assemblable into a color correction unit including a lamp and a diffusion box.

16. A color correction head comprising in combination:
   a body of said head;
   a light source which, when operative, creates a light path in said body, said light path extending out of said body;
   at least two filter supports drivably supported on said body;
   a color filter in each said filter support;
   said filter supports being drivably supported for movement of said filters therein to a desired extent across said path;
   a reversible permanent magnet DC motor on said body for each said filter support;
   a high reduction gearbox on said body for each said motor, said gearboxes being operatively connected to said motors and their said respective filter supports to enable said motors to drive said filter supports at a highly reduced rate, whereby the position of a said filter support is locked when its respective said motor has no drive voltage applied to it; and an analyser in said light path exiting said body and operatively connected to said motors to cause drive voltage to be applied to the same to drive respective said filter supports with said color filter therein to a controllable extent across said light path in response to the analysis of light received by said analyser in said light path;

said analyser including a switch for each said reversible permanent magnet DC motor for shorting terminals of said motor when said color filter is positioned to a desired extent across said light path.

17. A color correction head comprising in combination:
 a. a casing having a chassis;
 b. a light source creating when operating a light path in said casing with said light path exiting said casing;
 c. at least two filter supports movably mounted on said chassis for movement of color filters supported thereby in and out of said light path within said casing;
 d. a color filter in each said filter support;
 e. separate high reduction gearboxes mounted to said chassis and operatively connected to each said filter support;
 f. separate reversible DC motors operatively connected to each said high reduction gearbox to drive the same;
 g. an analyser in said light path exiting said casing and operatively connected to said motors to cause the same to drive each said filter support and color filter therein to a controllable extent in and out of said light path in response to the color of the light received by said analyser in said light path, said gearboxes providing sufficient internal friction to maintain said filter supports in position in the absence of drive voltage to said motors.

18. The color correcting head of claim 17 wherein said chassis and the components mounted thereon are removably mounted in said casing.

19. The color correcting head of claim 17 wherein each said high reduction gearbox has a cam associated therewith that effects movement of the filter support associated therewith, said filter support being held in contact with said cam under the action of a spring.

* * * * *